INVENTOR
A. J. RACK

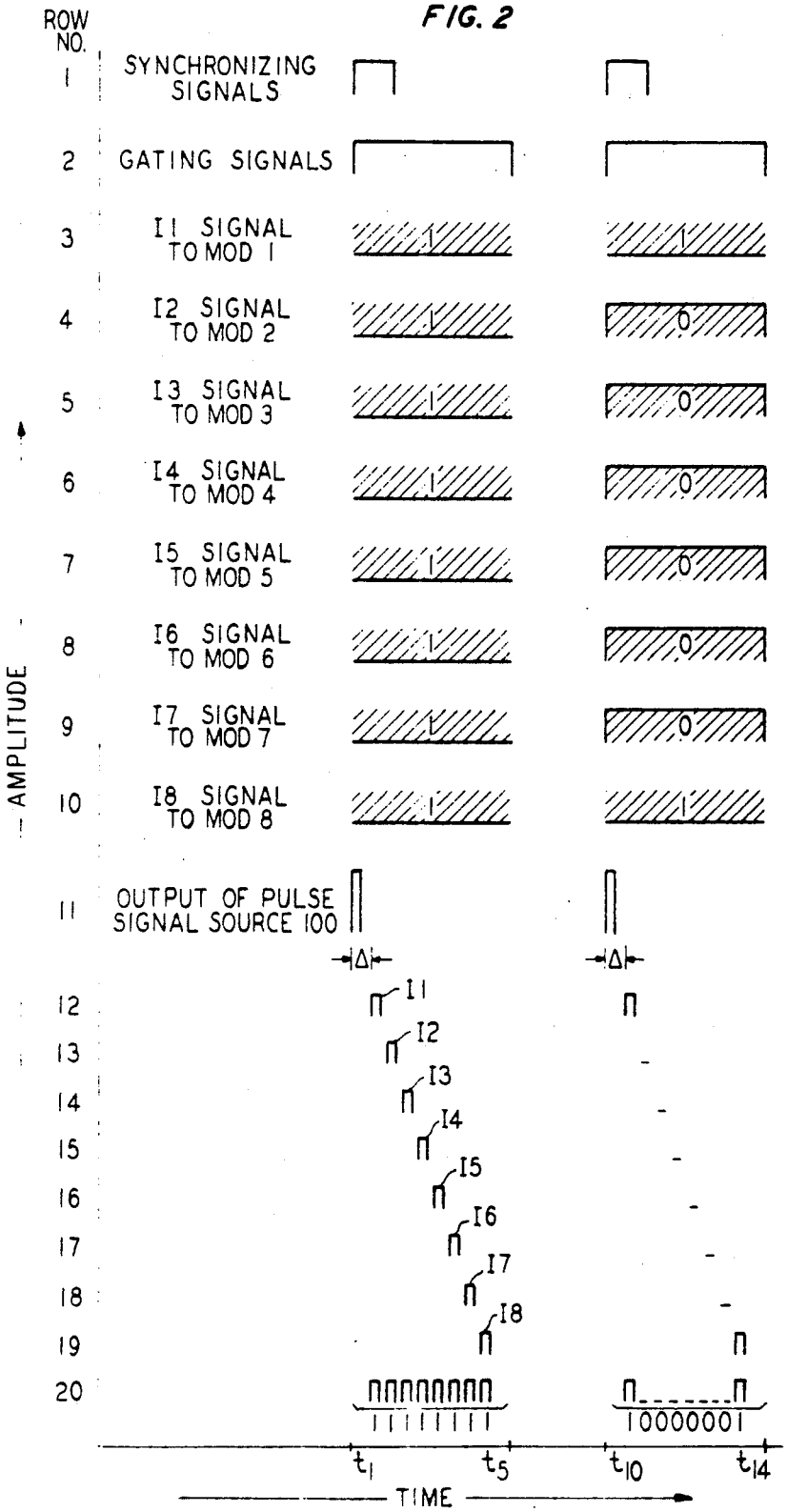

3,501,223
OPTICAL PULSE GENERATOR
Alois J. Rack, Martinsville, N.J., assignor to Bell Telephone Laboratories, Incorporated, New York, N.Y., a corporation of New York
Filed Nov. 23, 1965, Ser. No. 509,387
Int. Cl. G02b 27/14, 5/08; G02f 1/26
U.S. Cl. 350—171                             6 Claims

ABSTRACT OF THE DISCLOSURE

An optical pulse generator responds to each of a set of widely-spaced pulses to generate a series of equal-amplitude pulses suitable for efficient use in an information processing system. The generator comprises two parallel spaced-apart mirror members. The inner surface of one member is fully reflecting, whereas the inner surface of the other member exhibits a graded reflecting-transmitting characteristic. Optical energy transmitted through the other member is propagated along a plurality of paths each of which includes a modulator and a fully-reflecting mirror. A single optical pulse directed at the structure along an input path is successively divided by the other member. Pulses propagated through the modulators are reflected back to the members and subsequently directed toward the input path via paths of different lengths. In turn, a dispersive arrangement in the input path directs the reflected pulses either along a spatially distinct output path or along the input path itself, depending respectively on the conditions of the associated modulators.

---

Figure 1:
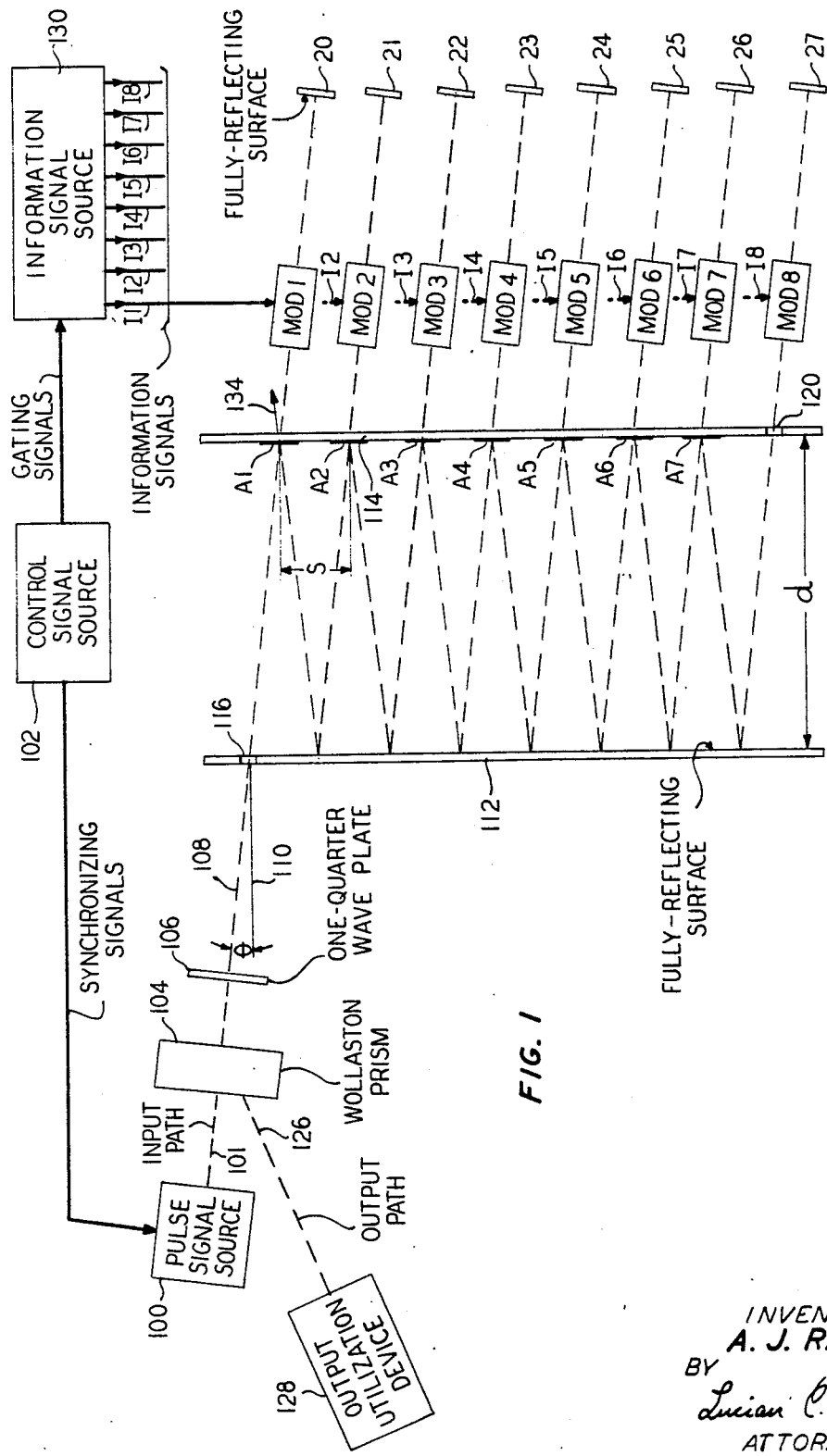

This invention relates to signal translating and more particularly to an arrangement for generating pulses suitable for use in an optical information processing system.

It is known to operate a laser in a mode wherein the output thereof comprises a series of very narrow pulses that are relatively widely spaced apart. In particular, the output pulses of one specific illustrative such laser are each characterized by a width of approximately 0.5 nanosecond. The pulse period of this specific laser is about 10 nanoseconds. L. E. Hargrove Patent 3,412,251, issued Nov. 19, 1968, describes a pulsed laser of this general type.

The information-handling capacity per unit time of a system that is designed to process narrow nanosecond pulses can be significantly increased if the pulse train output of a Hargrove-type laser is modified. Specifically, the information-handling capacity of the pulsed output thereof can be increased by generating a plurality of additional pulses during the aforenoted relatively wide interpulse interval. In turn, the plural optical pulses generated in response to each single signal supplied by the laser are adapted to be processed by arrangements such as optical transmission lines and memories.

An object of the present invention is the improvement of optical signal processing systems.

More specifically, an object of this invention is an arrangement for generating a pulse train suitable for efficient use in an optical information signal processing system.

Another object of the present invention is a reliable optical pulse generator that is characterized by simplicity of design, compactness and ease of fabrication.

These and other objects of the present invention are realized in a specific illustrative embodiment thereof that comprises first and second spaced-apart mirrors that are oriented in a facing parallel relationship to each other. The inner or facing surface of the first mirror fully reflects any incident radiation directed thereat, whereas the facing surface of the second mirror exhibits a graded reflecting-transmitting characteristic. An input optical pulse is directed through an aperture in the first mirror and along a path that is non-orthogonal to the mirrors. This input pulse impinges upon a first area of the facing surface of the second mirror. A portion of the impinging pulse is transmitted through the second mirror to a first modulation channel. The remaining portion of the pulse is reflected back to the fully-reflecting surface of the second mirror.

In accordance with the invention an optical pulse of diminishing amplitude is successively reflected between the two mirrors. Each time that this pulse impinges upon a selected area of the facing surface of the second mirror, a portion of the pulse is transmitted to an associated modulation channel. The reflecting-transmitting characteristics of the selected areas of the second mirror are graded such that the transmitted pulses routed to the respective modulation channels are equal in amplitude. In this way, the input pulse is split into a prescribed number of equal-amplitude signals that are respectively directed to a multiplicity of modulation channels.

Each modulation channel includes an optical modulator unit and a fully-reflecting mirror. Any signal that passes through an unactivated modulator unit is reflected back therethrough by its associated fully-reflecting mirror. This reflected signal is then directed by the first and second mirrors through the aforenoted aperture in the first mirror and along an output path to a utilization device. On the other hand, any signal that propagates through an activated modulator unit is selectively modified in such a manner that that signal is not directed to the utilization device.

The total lengths of the various paths traversed by pulses in propagating through the assemblage are respectively different. In particular, these lengths are so proportioned that each pulse which is reflected back through the assemblage to the output path reaches the utilization device in a different one of a plurality of spaced time slots. As a result, the embodiment responds to a single applied input pulse to produce an output sequence of spaced equal-amplitude pulses (or no-pulses). Whether or not an output pulse appears in its assigned time slot is, of course, a function of the condition of its associated modulator unit.

It is a feature of the present invention that an optical pulse arrangement include two parallel spaced-apart mirrors responsive to a single input optical pulse for generating a plurality of equal-amplitude output pulses.

It is another feature of this invention that the facing surface of one mirror fully reflect any radiation incident thereon and that the facing surface of the other mirror exhibit a graded reflecting-transmitting characteristic.

It is a further feature of the present invention that a portion of each optical pulse incident on the facing surface of the other mirror be directed to a modulation channel and that each such channel include an optical modulator unit and an associated fully-reflecting mirror, whereby the state of each modulator unit determines whether or not the pulse directed thereat is propagated back through the parallel mirror assembly to an output utilization device.

It is still another feature of this invention that the total lengths of the respective paths traversed by pulses in reaching the output utilization device be different, so that any pulses directed to the device arrive thereat in spaced-apart sequence.

A complete understanding of the present invention and of the above and other objects, features and advantages thereof may be gained from a consideration of the following detailed description of a specific illustrative embodiment thereof presented hereinbelow in connection with the accompanying drawing, in which:

FIG. 1 shows a specific illustrative optical pulse generating arrangement made in accordance with the principles of the present invention; and FIG. 2 depicts various waveforms representative of the mode of operation of the arrangement shown in FIG. 1.

The arrangement of FIG. 1 includes a pulse signal source 100 which may, for example, comprise a pulsed laser of the type described in the aforecited Hargrove Patent. Synchronizing signals are applied to the source 100 from a control signal source 102. In response to each such synchronizing signal (represented in row No. 1 of FIG. 2), the source 100 emits a narrow pulse of electromagnetic energy of the general form shown in row No. 11 of FIG. 2.

Illustratively, the input pulse emitted by the source 100 of FIG. 1 comprises a narrow burst of plane-polarized light. This emitted pulse is directed through a conventional Wollaston prism 104 and a standard one-quarter wave plate 106, which are oriented in a manner well-known in the art to cause the polarization of the electromagnetic energy that emerges from the right-hand side of the plate 106 to be circular in nature.

The propagation vector of the optical pulse that emerges from the plate 106 shown in FIG. 1 is directed along a dashed-line path 108 that is disposed at an angle $\theta$ with respect to a reference horizontal line 110. In turn, the line 110 is orthogonal to first and second plane mirror members 112 and 114 which are oriented in a parallel spaced-apart facing relationship. In FIG. 1 the distance between the members 112 and 114 is designated by the letter $d$.

The first mirror member 112 includes therein an aperture 116 through which the aforenoted optical pulse propagates along the depicted dashed-line path. Except for the aperture 116, the inner facing surface of the mirror 112 (that is, the surface thereof that faces the second mirror member 114) comprises any conventional medium that exhibits the characteristics of fully reflecting optical energy incident thereon.

Spaced portions of the inner facing surface of the second mirror member 114 are adapted to exhibit a graded reflecting-transmitting characteristic. In other words, each such portion transmits a preselected part of the pulse incident thereon and reflects the remaining part. The reflected part propagates along an oblique dashed-line path back to the fully-reflecting surface of the mirror member 112. The transmitted part traverse the member 114 to an associated modulation channel of the type described below.

Various techniques for treating a mirror member to cause it to exhibit a reflecting-transmitting or beam-splitting characteristic are well-known in the optical art. In accordance with any of these techniques, the particular reflecting-transmitting property of each one of the noted spaced portions of the member 114 may be selectively controlled.

The mirror 114 of the specific illustrative embodiment shown in FIG. 1 includes eight spaced areas to which a portion of the input optical pulse is successively directed. The uppermost one of these areas (designated $A_1$) is directly in the path of the input pulse that enters the inter-mirror space via the aperture 116. In accordance with the present invention, the requisite reflecting-transmitting characteristic of the area $A_1$ (and of each of the other spaced areas) is determined from the expression:

$$R_n = \frac{1-\frac{n}{N}}{1-\left(\frac{n-1}{N}\right)} \quad (1)$$

when $R_n$ is the reflectivity of the $n$th one of the spaced areas, N equals the total number of spaced areas, and wherein the areas are numbered from top to bottom from 1 through $n$. From expression (1) it is evident that the reflectivity $R_1$ of the area $A_1$ is ⅞ or 0.875. In other words, if an input pulse having an amplitude of eight units is directed at the area $A_1$, a seven-unit amplitude pulse is reflected back from $A_1$ to the fully-reflecting surface of the member 112, and a pulse of unit amplitude is transmitted through the member 114 to an associated modulation channel which includes a first modulator unit designated MOD1 and a fully-reflecting mirror member 20.

In accordance with the principles of the present invention it is determined from expression (1) that the respective reflectivities of the areas $A_2$ through $A_7$ of the illustrative arrangement shown in FIG. 1 are as follows: 0.857, 0.833, 0.800, 0.750, 0.667 and 0.500. An additional or bottom-most area having a reflectivity of 0.000 may also be provided. Equivalently, and as shown in FIG. 1, the bottom-most area may simply comprise an aperture 120.

By grading the reflecting-transmitting characteristics of the aforenoted spaced areas in the manner specified, an optical pulse of unit amplitude is directed along each of the eight depicted modulation channels. It is evident from FIG. 1 that each of these unit-amplitude pulses traverses a different-length path to its respective modulator unit. Similarly, it is apparent that that portion of each pulse that is reflected back from the mirror members 20 through 27 into the inter-mirror space between the members 112 and 114 propagates along a different characteristic path length to reach the entry-exit aperture 116. The time between the leading edges of adjacent such pulses is given by the expression:

$$T = \frac{4d}{C} \cos \theta \quad (2)$$

where $d$ and $\theta$ are as defined earlier above and C is the velocity of light. For one specific illustrative embodiment in which $d$ was 9.375 centimeters and $\theta$ was 0.04 radian, this inter-pulse spacing was 1.25 nanoseconds.

The vertical distance S between the center points of adjacent reflecting-transmitting areas on the facing surface of the mirror member 114 is given by the expression:

$$S = 2d \tan \theta \quad (3)$$

For the particular values of $d$ and $\theta$ specified above, S was 7.5 millimeters.

Illustratively, each of the eight modulator units MOD1 through MOD8 shown in FIG. 1 comprises an element of potassium dihydrogen phosphate (KDP). By applying respective electrical control signals to such modulator units, the conditions of the units may be selectively controlled to determine whether or not pulses propagated therethrough are eventually routed back to an output path 126 and an output utilization device 128. Illustratively, the modulator units are controlled by electrical information signals I1 through I8 supplied thereto by an information signal source 130 in response to the application to the source 130 of a gating signal from the control source 102. These information signals are respectively applied to the units MOD1 through MOD8 via a plurality of electrical leads. In the interest of not unduly cluttering FIG. 1, only the information-carrying lead extending to the unit MOD1 is actually shown in the drawing.

Assume that a particular modulator unit, say, the unit MOD3, does not have an electrical control potential applied thereto from the source 130. (The absence of an electrical potential will be considered herein to be representative of a "1" information signal.) As a result, the circular polarization condition of the pulse that propagates through the unit MOD3 is unchanged in transit therethrough. In subsequently propagating back through the one-quarter wave plate 106, this circularly-polarized pulse is converted to a plane-polarized burst whose plane of polarization is rotated 90 degrees from that characteristic of the original input pulse emitted by the signal source 100. Consequently, and due to the inherent birefringent property of the Wollaston prism 104, this plane-polarized pulse is directed along the output path 126 which, as seen in FIG. 1, is spatially distinct from the depicted input pulse path 101 that extends between the source 100 and the prism 104.

On the other hand, assume that an electrical control potential, indicative of a "0" information signal, is applied to the modulator unit MOD3 from the source 130 during the time interval in which an optical pulse traverses the unit MOD3. The effect of so activating the unit MOD3 is to cause the polarization condition of the pulse propagated therethrough to be altered. In particular, the circularly-polarized pulse is converted to an elliptically-polarized one. Subsequently, in passing through the one-quarter wave plate 106, the polarization condition of the reflected-back pulse remains elliptical (but in a different sense). In turn, the Wollaston prism 104 responds to the elliptically-polarized pulse by directing substantially all of the energy thereof along the input path 101, whereby almost none of the pulse energy propagates along the output path 126 to the utilization device 128.

Thus, by selective electrical control of the modular units MOD1 through MOD8, the nature of the pulse train delivered to the output utilization device 128 may be easily controlled. For example, in the absence of the application of control potentials to the units MOD1 through MOD8 (indicative of eight "1" signals respectively supplied thereto by the source 130), the eight time-spaced pulses reflected back from the mirror members 20 through 27 are, for the reasons specified above, eventually directed in sequence to the output utilization device 128. FIG. 2 illustrates the particular case wherein eight "1" representations are applied to the modulator units from the information signal source 130 in time coincidence with the application of a gating signal from the source 102 to the source 130. The relative times of arrival of the reflected-back pulses at the utilization device 128 are indicated in rows 12 through 19 of FIG. 2. Row No. 20 is simply a composite depiction of the complete pulse train that is delivered to the device 128 during the time interval designated $t_1$ through $t_5$. It is noted that the first pulse (representative of the information signal I1) supplied to the device 128 arrives thereat after a transit time delay of $\Delta$ seconds relative to the leading edge of the initiating pulse supplied at time $t_1$ by the source 100.

During the time interval marked $t_{10}$ through $t_{14}$ in FIG. 2, the information signals respectively represented in rows 3 through 10 are applied to the modulator units MOD1 through MOD8 of FIG. 1. In response thereto, the reflected-back pulses corresponding to the information signals I1 and I8 are routed to the output utilization device 128, whereas the reflected back pulses corresponding to the information signals I2 through I7 are not directed thereto. The resulting sequence of pulses actually delivered to the device 128 in the interval $t_{10}$ through $t_{14}$ is shown in row No. 20 of FIG. 2. As indicated in FIG. 2, this sequence is representative of the binary word 10000001.

It is apparent from an inspection of the last row of FIG. 2 that the repetition rate of the narrow pulse sequences delivered to the device 128 is eight times the rate at which pulses are generated by the signal source 100. As a result, the information-handling capacities of the optical sequences delivered to the device 128 are enhanced over the capacity inherent in the characteristic output pulses of the source 100. It is significant to note that this increase in capacity is achieved through the action of modulator units which, while individually operating at a maximum rate R, participate in the generation of an output pulse train having a rate 8R.

It is noted that a portion of each pulse that is reflected back through its associated modulator unit from the fully-reflecting mirrors 20 through 27 is lost due to reflection at the mirror 114. For example, a portion of the reflected-back pulse that propagates from right to left through the unit MOD1 is reflected from the reflecting-transmitting mirror 114 in the direction of arrow 134. This portion of the pulse constitutes lost energy. The remaining or information-carrying portion of this reflected-back pulse is transmitted through the mirror 114 and then, as described above, is directed along the dashed line path through the aperture 116 to the routing arrangement that includes the plate 106 and the prism 104.

In addition, energy is lost whenever a reflected-back pulse impinges upon the facing surface of the mirror 114 in transit to the aperture 116. For example, the pulse that is reflected-back through the modulator unit MOD2 and through the mirror 114 is reflected from the mirror 112 and directed at the area $A_1$. In turn, a prescribed portion of this pulse is reflected from the area $A_1$ and propagated through the aperture 116 to the plate 106. However, the remaining portion of the reflected-back pulse incident on $A_1$ is transmitted therethrough in the direction of the arrow 134 and constitutes lost energy.

Thus, there has been described herein a specific exemplary compact assembly which illustratively embodies the principles of the present invention. As set forth above, the combination responds to a single input optical pulse by generating a sequence of reduced-amplitude optical pulses suitable for efficient use in an optical information processing system.

It is to be understood that the above-described arrangements are only illustrative of the application of the principles of the present invention. In accordance with these principles, numerous other arrangements may be devised by those skilled in the art without departing from the spirit and scope of the invention. For example, although the modulator units included in the FIG. 1 arrangement are described above as being of the type that selectively control the polarization condition of pulses that propagate therethrough, it is, of course, feasible to substitute therefor modulator units that affect incident pulses in some other fashion. For instance, each such unit may comprise a conventional optical deflection device which when activated routes the propagation vector of the pulse propagated therethrough along a path that does not impinge upon its associated fully-reflecting mirror.

In addition, although emphasis above is directed to an output sequence comprising evenly-spaced pulses, it is to be understood that the principles of the present invention are not restricted thereto. If desired, the various path lengths traversed by pulses can be proportioned such that the output pulses are not evenly spaced. Any desired pulse spacing can be achieved simply by selective positioning of the mirror members 20 through 27 which, as shown in FIG. 1, are each spaced from the mirror 114 by the same path length. Alternatively, the relative dimensioning of the illustrative assembly may be controlled by interposing electro-optic elements (not shown) in the various pulse propagation paths. By electrically varying the index of refraction of each such element, the effective path length of radiant energy propagated therethrough may be selectively and easily altered.

Also, it is to be understood that the principles of this invention are not limited to a pulse generator that includes eight modulation channels. In accordance with the invention, the number of channels may be varied as desired to achieve any required multiplication of the natural repetition rate of the pulsed output of the signal source 100.

What is claimed is:

1. In combination, two parallel spaced-apart plane mirror members positioned in facing relationship to each other, the facing surface of one of said members having a fully-reflecting coating thereon, and selected portions of the facing surface of said other member having respective reflecting-transmitting characteristics that are progressively graded to exhibit an ever-decreasing reflecting property.

2. A combination as in claim 1 further including means for directing an input pulse of electromagnetic energy into the space between said mirror members along a path that is non-orthogonal to said members, whereby a portion of said input pulse is successively reflected a prescribed number of times between said facing surfaces and an equal-amplitude portion thereof is transmitted through said other member along an associated modulation channel each time that said pulse impinges on one of the selected portions of the facing surface of said other member.

3. A combination as in claim 2 wherein each modulation channel includes a modulator unit and means for fully reflecting any electromagnetic energy that is propagated along a forward path through each such unit, said reflected energy being directed along a reverse path that extends through said unit and is spatially coincident with said forward propagation path.

4. A combination as in claim 3 wherein said directing means includes an aperture in said one member and a pulse signal source positioned in spaced alignment with said aperture for directing an input pulse therethrough.

5. A combination as in claim 4 still further including a Wollaston prism and a one-quarter wave plate interposed in that order between said pulse signal source and said aperture.

6. In combination in an optical pulse generator, a first plate member having a fully-reflecting coating on one surface thereof, a second plate member positioned in a spaced-apart parallel relationship to said first plate member, said coating facing said second plate member, said second plate member having a graded reflecting-transmitting coating on the surface thereof that faces said first plate member, said reflecting-transmitting coating being progressively graded to exhibit an ever-decreasing reflecting property, means for directing a single optical input pulse into the space between said first and second members along a path that is non-orthogonal to said members, whereby said input pulse is successively reflected between said members to impinge upon spaced portions of the facing surface of said second member, so that an equal-amplitude portion of the pulse impinging on each such spaced portion is transmitted through said second member, and means spaced apart from the non-facing surface of said second member for reflecting back to said second member and into said space selected ones of the pulses transmitted through said second member.

References Cited

UNITED STATES PATENTS

| | | | |
|---|---|---|---|
| 3,256,443 | 6/1966 | Moore | 250—199 |
| 3,277,393 | 10/1966 | Nicolai. | |
| 3,297,876 | 1/1967 | De Maria | 250—199 |
| 3,302,027 | 1/1967 | Fried | 250—199 |

FOREIGN PATENTS 1,353,566  1/1969  France.

OTHER REFERENCES

Mohler: American Journal of Physics, Optical Filters, December 1952, vol. 20, No. 9, pp. 583–588.

RONALD L. WIBERT, Primary Examiner

P. K. GODWIN, Jr., Assistant Examiner

U.S. Cl. X.R.

250—199; 332—41; 350—150, 299